United States Patent [19]

Conners et al.

[11] 3,727,883

[45] Apr. 17, 1973

[54] BUTTERFLY VALVE

[75] Inventors: John A. Conners, Fairfield; Donald W. Liepelt, Madison; William H. Baulieu, Monroe, all of Conn.

[73] Assignee: Jenkins Bros., Bridgeport, Conn.

[22] Filed: Jan. 26, 1972

[21] Appl. No.: 220,958

[52] U.S. Cl. .................................251/306, 251/148
[51] Int. Cl. .................................................F16k 1/22
[58] Field of Search..................251/148, 151, 152, 251/305, 306, 173

[56] References Cited

UNITED STATES PATENTS

| | | | |
|---|---|---|---|
| 2,994,342 | 8/1961 | Stillwagon | 251/306 X |
| 3,241,806 | 3/1966 | Snell, Jr. | 251/148 |
| 3,253,815 | 5/1966 | Stillwagon | 251/148 |
| 3,473,784 | 10/1969 | Radford | 251/148 X |
| 3,540,691 | 11/1970 | Snell, Jr. | 251/151 |
| 3,633,872 | 1/1972 | Wright | 251/306 |

*Primary Examiner*—William R. Cline
*Attorney*—James D. Bock

[57] ABSTRACT

Butterfly valve assembly for installation in a pipe line between flanges. Assembly includes rigid tubular valve body and resilient valve seat insert to make tight seal with flanges when installed and to make tight seal with valve disc in service. Seat insert has certain dimensions undersize relative to valve body so that insert must be stretched when fitted to body and is further stretched when flanges are tightened during installation. Stretching assures secure fit between insert and body before installation and leak proof seal after installation. Seat insert and valve body have cooperating radial ledges asymmetrically located to prevent relative movement when valve disc is closed. Insert has annular flange sealing portions each with an inturned bead which enters an annular groove formed in the valve body. Flange sealing portions are so shaped that when valve is installed between flanges of a pipe line the beads are forced into but do not fill the grooves thus reducing tendency toward squeezing excess resilient material into, and consequent loosening of, the portion of the insert in which the disc must seat.

5 Claims, 10 Drawing Figures

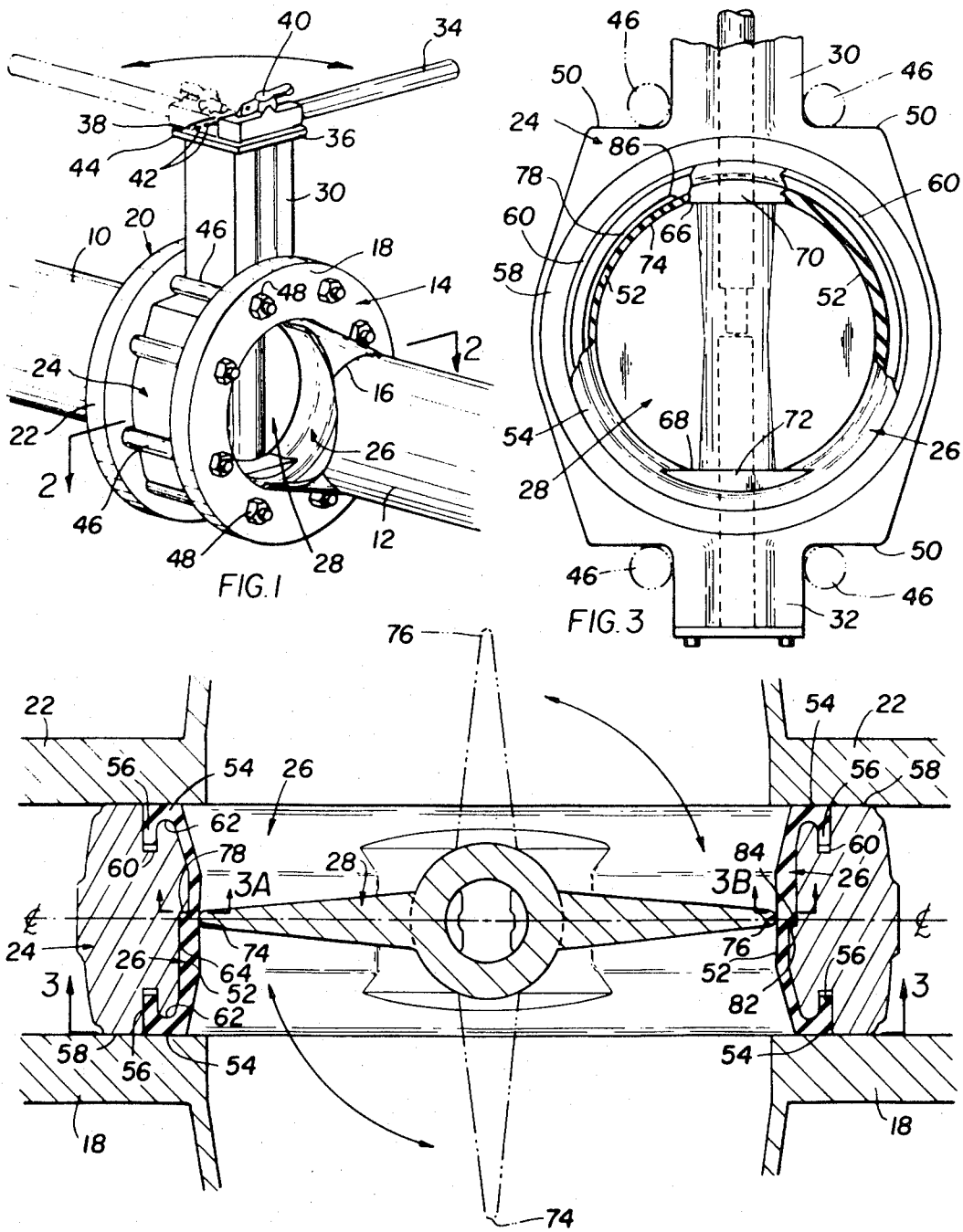

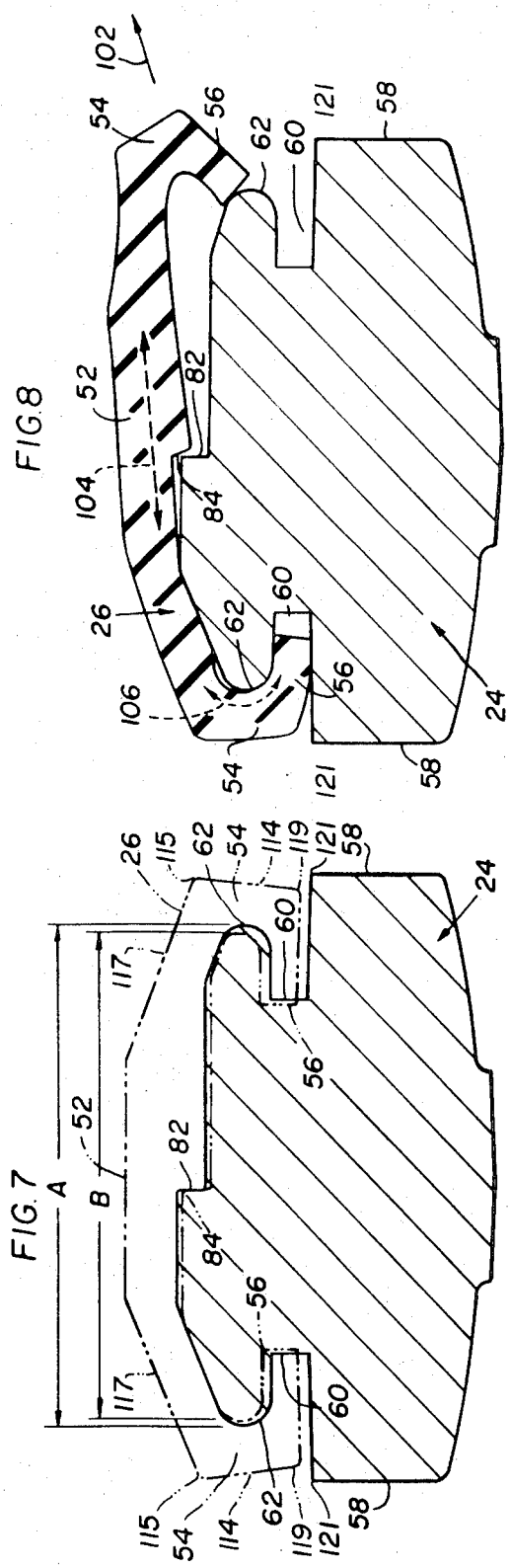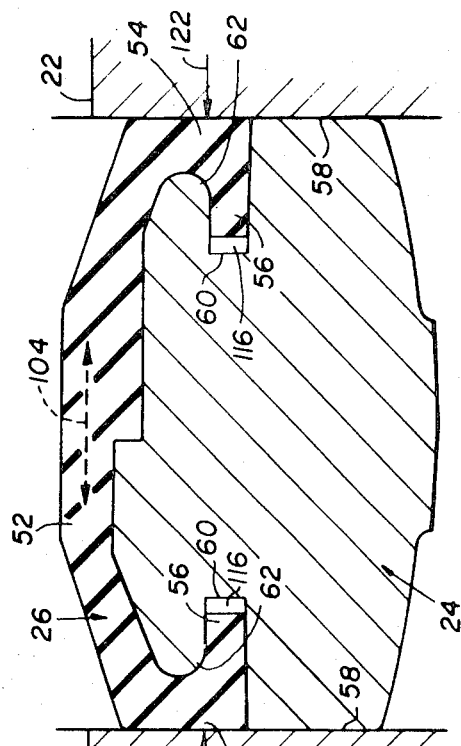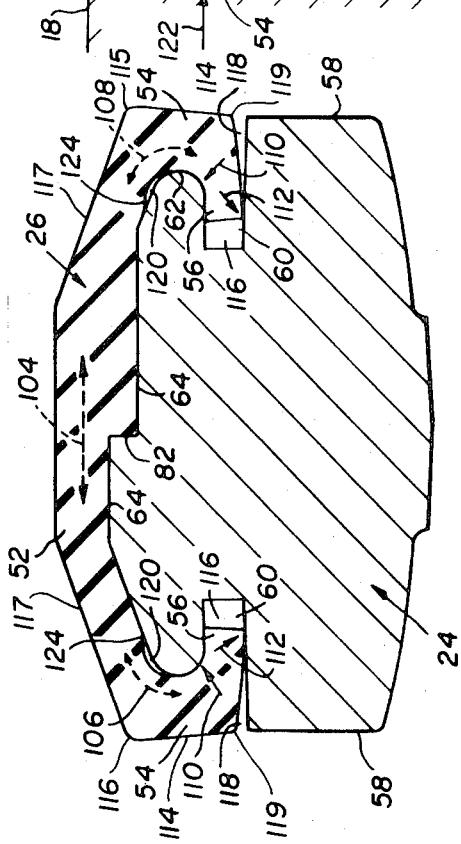

BUTTERFLY VALVE

BACKGROUND OF THE INVENTION

U.S. Pat. No. 1,844,641; 2,740,423; 2,994,342 and 3,263,960 are illustrative of butterfly valve assemblies having resilient seat inserts which serve to seal a valve body between flanges in a pipe line and also serve to form a seal with the valve disc when the latter is in closed position. Of these U.S. Pat. Nos. 2,744,473 and 2,994,342 provide at least enough, preferably more than enough, elastomeric material in the flange sealing portions of the seat insert to fill recesses formed in the valve body and the spaces between flanges and valve body when the flanges are squeezed into installed positions. By so doing the excess elastomeric material in these regions is forced into the seat portion of the insert thus loosening contact between the insert and valve body in the region where a seal is to be formed with the valve disc. U.S. Pat. No. 3,263,960 provides symmetrical radial ledges in body and insert which cooperate with a disc having asymmetrical circumferential portions thus providing resistance to relative movement between insert and body when the disc is moved toward closed position. However the symmetrical ledges with asymmetrical disc edges require the latter to move through and beyond a dead-center position as they approach closed position. This results in a tendency to reduce tightness of seal in final position and also requires movement backwardly through dead-center position when the disc is moved toward open position. Also forming a part of the background of the present invention is an application for U.S. Pat., Ser. No. 147,400 filed by the applicants herein on May 27, 1971, now U.S. Pat. No. 3,692,276.

BRIEF DESCRIPTION OF THE INVENTION

The present invention is an improvement upon the invention disclosed and claimed in an application for United States Patent filed jointly by the applicants herein on May 27, 1971, Ser. No. 147,400.

As disclosed and claimed in said application Ser. No. 147,400, the resilient valve seat insert to which the present invention is applied, is made of stretchable elastomeric material and preferably is so dimensioned with respect to the valve body that it must be stretched axially of the tubular seating portion thereof to be fitted into the valve body. When thus fitted the flange sealing portions of the insert wedge the insert in fitted position. When the assembly of body and insert is squeezed between flanges of a pipe line for installation in the line the flange sealing portions are progressively fulcrummed and squeezed into final position.

Also, the present invention is preferably but not necessarily embodied in a combination such as disclosed and claimed in said application Ser. No. 147,400 wherein the valve body and insert are provided with cooperating radial ledges located just beyond dead-center position of the disc edges in closed position. These ledges are asymmetrical whereby as the symmetrical disc edges move toward closed position the elastomeric material of the seat portion of the insert is displaced forwardly and compressively crammed against the ledges in the valve body. This assures a tight seal, assures against bodily displacement of the stretched seat portion relatively to the body as the disc moves toward closed position. When the disc is first moved toward open position, the insert can move with the disc for a small distance to facilitate opening.

In the present invention the flange sealing portions of the valve seat insert are different in design and operation from those disclosed in said application Ser. No. 147,400 or those disclosed in said U.S. Pat. Nos. 2,744,473 and 2,994,342 in that the flange portions of the resilient valve seat insert or liner deliberately do not contain sufficient elastomeric material to fill, or substantially fill, the annular grooves provided in the valve body when the assembled valve body and seat is installed for service between flanges of a pipe line. The flange portions of the present invention are so designed as to assure a tight seal when so installed even through such grooves or recesses are not filled and a particular advantage of this design is that there is little tendency toward loosening of the seat on the valve body because the elastomeric material when squeezed by the flanges tends to flow into the unfilled recesses rather than into the seat portion of the liner.

BRIEF DESCRIPTION OF THE DRAWINGS

In the drawings:

FIG. 1 is an isometric view of a butterfly valve embodying the present invention showing the valve installed between flanges for service in a line and with parts broken away to reveal portions of the inner structure of the valve;

FIG. 2 is an enlarged horizontal sectional view taken along the line 2—2 in FIG. 1;

FIG. 3 is a side elevational view of the valve taken along the line 3—3 in FIG. 2, with parts broken away generally along the lines 3A and 3B in FIG. 2;

FIG. 7 is an enlarged sectional view corresponding generally with FIG. 2 showing the valve body in solid lines and showing the elastomeric valve seat in relaxed or unfitted condition in broken lines superimposed upon the valve body;

FIG. 8 is a view similar to FIG. 7 but showing the elastomeric valve seat in process of being fitted to the valve body;

FIG. 9 is a view similar to FIG. 8 but showing the elastomeric valve seat fitted on the valve body and prior to installation of the valve in a line; and FIG. 10 is a view similar to FIG. 9 but showing the position assumed by the elastomeric valve seat when the valve is installed between flanges for service in a line.

DESCRIPTION OF PREFERRED EMBODIMENT

Figure 4:
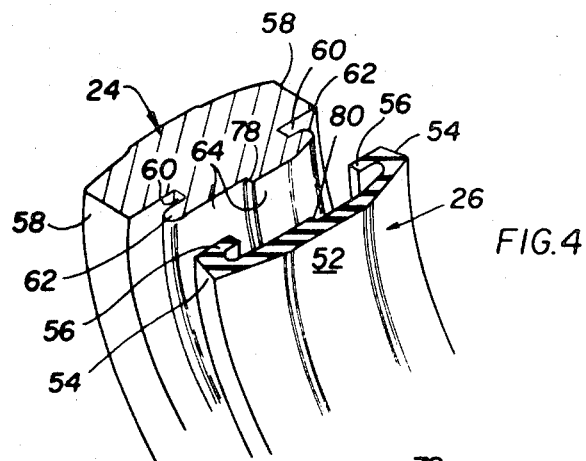
FIGS. 4, 5 and 6 are fragmentary isometric views illustrating the relationship between the valve body and the elastomeric valve seat insert of a valve embodying the present invention.

In FIG. 1 a butterfly valve embodying the present invention is shown assembled in operative relation with a line for the control of flow of a fluid under pressure. The line is illustratively shown as comprising conduits 10 and 12 each having a flange fitting secured thereto. The fitting 14 on conduit 12 is shown welded along a line 16 and having a flange 18. The fitting 20 on conduit 10 may be of the same or any desired construction and is provided with a flange 22. Obviously the fittings 14 and 20 may be of any conventional type secured to the conduits by internal or external threads, flanges or the like.

The butterfly valve of the present invention comprises a valve body 24 having a valve seat liner 26 made of elastomeric material and a valve disc 28. The valve body 24 has upper and lower necks 30 and 32 (see FIG. 3) providing bearings and seals for the stem structure on which the disc 28 is mounted to be rotated between closed and open positions, the disc 28 making an interference fit with the elastomeric valve seat liner 26 when in closed position thus to provide a leak proof closure for the line in which the valve is installed. The upper neck 30 extends for a considerable distance radially of the valve body to allow for the application of pipe insulation where required and at its outer end is provided with any suitable manual or power driven actuator for turning the stem. In FIG. 1 an actuator in the form of a simple hand lever 34 is rotatable through 90° between stops 36 and 38. The lever 34 is provided with a locking lever 40 for controlling a locking pin (not shown) which may be selectively seated in any one of a plurality of pin-receiving holes 42 formed in an index plate 44 thus to lock the lever 34 and disc 28 in open, closed or intermediate positions.

The butterfly valve thus is a wafer-like assembly which is adapted to be easily installed between flanges 18 and 22 and held in position by a plurality of bolts 46 which extend through suitable aligned openings in the flanges and are secured by nuts 48. As shown in FIG. 3 the valve body 24 is preferably provided with shoulders 50 which intersect with the necks 30 and 32 in such locations that four of the bolts 46 will fit quite snugly in the intersections and thus will serve to accurately position the valve assembly with respect to the flanges 18 and 22 during installation. For example the lowermost bolts 46, shown in FIG. 3, may be slipped loosely into the flange openings, the valve assembly (with disc 28 closed) then may be lowered into position, the uppermost bolts 46 then may be inserted loosely as the valve assembly is adjusted into proper position. After tightening the nuts 48 on these first four bolts 46 the remaining bolts and nuts may be inserted and tightened to complete the installation procedure.

Referring now to FIG. 2 the valve assembly 24, 26, 28 is shown installed between the flanges 18 and 22 and the disc 28 is shown in closed position, in full lines, with the periphery thereof pressing into the elastomeric material of the valve seat insert 26. For purposes of orientation in this description the centerline of the generally circular opening circumscribed by the valve seat insert 26 will be referred to as the axis of the valve assembly and the locations of various structural features will be described in terms of spacing radially from that axis. When words such as "upper," "lower," "right-hand" or "left-hand" are used they are used only in respect to the particular positions of parts as shown in the several views in the drawings. It will be understood, for example, that the valve assembly in FIG. 1 is shown with the hand lever 34 uppermost and certain of the other views are related with that showing. However, as will be apparent, the valve assembly may be installed in generally horizontal lines with the lever 34 up, down or at substantially any desired angle with respect to the horizontal. Also, the valve assembly may be installed in generally vertically or otherwise angularly disposed lines with the lever 34 in any position desired for convenience in operation.

Preferably the present invention is embodied in a combination utilizing the features disclosed and claimed in said application Ser. No. 147,400. Thus the elastomeric seat insert 26 preferably is so sized and shaped that it must be stretched to be fitted upon the body 24 and asymmetrical ledges are formed on the valve body 24 to mate with similar ledges on the valve seat insert 26 in positions such as to effectively prevent movement of the seat upon the body when the disc 28 is rotated to closed position. These features will be described in detail concurrently with the particular features of the present invention.

Referring to FIGS. 2 and 4 the elastomeric seat insert 26 is provided with an annular seat portion 52 which extends axially of the valve body 24 and lies against the inner surface of the body, flange sealing portions 54 which extend radially outwardly from the seat portion 52 and beads 56 which extend axially toward one another. The valve body 24 is provided with accurately machined annular end walls 58 which meet flatwise in metal-to-metal contact with the axially opposed faces of the flanges 18 and 22 when the valve assembly is installed in final position between such flanges. The valve body 24 also has annular grooves 60 extending axially inwardly from the radially outward circumference of each of the end walls 58 to receive the beads 56 of the elastomeric seat insert. The valve body 24 also has a pair of oppositely disposed annular ribs 62 which extend axially outwardly of the valve body and terminate at the high points of convexly curved surfaces lying axially inwardly of the planes of end walls 58 to provide space for the flange sealing portions 54 of the seat insert 26. The curved surfaces of ribs 62 merge smoothly into the interior surfaces of grooves 60 and into the seat supporting surface 64 of the valve body 24. In the assembled and installed position shown in FIG. 2 the elastomeric material in the beads 56 of the seat insert 26 is pressed into but does not fill the grooves 60 and is firmly pressed between the flanges 18 and 22 and the curved surfaces of ribs 62. As will be explained below the elastomeric material of seat insert 26 also remains stretched across the seat supporting surface 64 of the valve body 24.

As shown in FIG. 3 the disc 28 is circular with flattened upper and lower ends 66 and 68 which engage mating flattened conformations 70 and 72 in the elastomeric seat insert 26 (also see FIG. 5) to form seals at such ends of the disc. The major portion of the periphery of disc 28 is circular having a diameter somewhat greater than the inside diameter of the seat portion 52 of the elastomeric seat insert 26. The circular portion of disc 28 is provided with a convex surface 74 on the left-hand side of FIG. 2 and a convex surface 76 on the right-hand side of that view. When the disc 28 is moved clockwise from the open position shown in broken lines in FIG. 2 toward the closed position shown in full lines, the convex surfaces 74 and 76 will engage the associated surface portions of the elastomeric seat insert 26 and will act as squeegees as they move on to closed position. In the closed position the surfaces 74 and 76 will press, outwardly of the axis of the valve, into elastomeric material of the seat insert 26.

It will be appreciated that as the disc 28 is moved through the last few degrees of rotation into closed position, as just described, increasing pressure will be exerted by the surfaces 74 and 76 upon the elastomeric material of seat insert 26 with attendant increasing frictional forces which would tend to displace portions of the seat insert 26 relative to the valve body 24. Such displacement tends to form ripples in the elastomeric material just ahead of the advancing disc surfaces 74 and 76.

Figure 5:
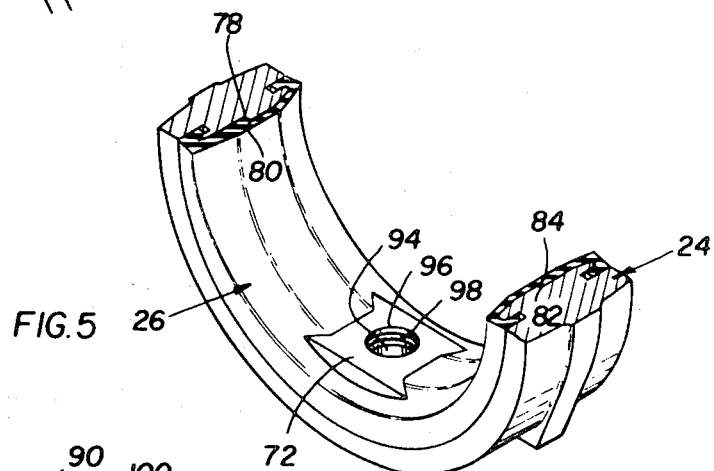

In said application Ser. No. 147,400, asymmetrical mating ledges in body and insert, referred to briefly above, are disclosed and claimed. This feature may be used in connection with the present invention but it will be understood that the present invention is not limited to such use. The use of the asymmetrical ledges is shown in the drawings herein as a preferred but optional feature. Referring first to FIG. 4 a ledge 78 is formed in that portion of the metal valve body 24 and a mating ledge 80 is formed in that portion of the elastomeric seat insert 26 shown, respectively, in that view. The ledge 78 comprises a flat surface lying in a plane perpendicular to the valve axis and is slightly offset from a center line extending through the axis upon which the disc 28 turns. The direction of offset and the reason therefor will be explained below. Referring to FIG. 5, in the right-hand portion of this view a ledge 82 is formed in the metal valve body 24 and a mating ledge 84 is formed in the elastomeric seat insert 26. The ledges 82 and 84 are similar to but face in opposite directions from the ledges 78 and 80 shown in FIG. 4 and on the left hand side of FIG. 5. The ledge 82 is offset from the disc center line in the opposite direction from the direction of offset of ledge 78.

Referring now to FIG. 2 it will be apparent that the ledges 78 and 80 on the left-hand side of this view are so arranged that the elastomeric material in the seat portion 52 is relatively thick in the zone in which the convex edge 74 of disc 28 sweeps when moving to closed position and that the thickness of the elastomeric material is made abruptly thinner beyond the plane in which the ledges 78, 80 mate. When the disc 28 is stopped in fully closed position the high point of the convex edge 74 thereof is in a transverse plane including the centerline CL. The radial plane in which the ledges 78 and 80 mate is offset beyond that centerline, as clearly shown in FIG. 2, whereby maximum pressure is exerted by the convex edge 74 of disc 28 on the elastomeric material extending ahead of said edge and into abutment with the metal ledge 78. As the disc sweeps into closed position it tends to push the elastomeric material ahead of it, cramming the material tightly into engagement with the ledge 78. Since, as will be more fully explained below, the elastomeric material in the seat portion 52 is stretched axially of the valve and across the seat supporting surface 64 of the valve body, the displacement of elastomeric material ahead of the disc edge 74 will feed some elastomeric material into the stretched thinner section of the elastomeric seat but will reduce the formation of ripples or tendency for the seat insert to move relative to the valve body.

Still referring to the left-hand side of FIG. 2 it will be appreciated that although in the closed position the disc 28 coincides with the transverse centerline of the valve the convex edge 74 thereof does not reach a dead-center position with respect to the elastomeric material of the seat insert 26. Rather in fully closed position the high point of the edge 74 still lies short of the offset ledge 78 on the valve body and it continues to hold the elastomeric material in a distorted condition with portions of it crammed against ledge 78. The energy stored in the distorted elastomeric material pushes constantly on the edge 74 thus tending to turn the disc 28 toward open position. This assures tight closure of the valve. Thus when it is desired to open the valve assembly by rotating the disc 28 counterclockwise the locally distorted elastomeric material will assist rather than resist the initial movement of the edge 74 away from closed position. Continued movement of the edge 74 in counterclockwise direction will result in progressively reduced pressure between said edge and the surface of the elastomeric valve seat.

Referring to the right-hand side of FIG. 2 it will be apparent that the mating ledges 82 and 84 are also offset beyond the centerline of the valve disc whereby the smoothly rounded edge portion 76 of disc 28 may be brought into and taken out of the fully closed position without danger of displacing or unseating of the valve seat 26 as already described in connection with the left-hand side of this FIG. As noted above the present invention is not limited to use with the mating ledges 78, 80 and 82, 84 offset beyond the centerline inasmuch as satisfactory results are achieved with the ledges on center or offset ahead of the centerline. Also, the prior art reveals other ways of controlling displacement which may be adapted to valves embodying the present invention.

In FIG. 3, portions of the valve assembly are broken away on the left-hand side of the view to show the ledge 78 in elevation. From this Figure it will be observed that the ledge 78 extends circumferentially for a distance substantially matching the length of the rounded edge portion 74 of disc 28. Thus the ledge 78 terminates at a point 86 substantially coinciding with the point at which the flat upper surface 66 of disc 28 begins. Although not shown in FIG. 3 the opposite end of ledge 78 terminates at a point substantially coinciding with the beginning of the flat lower surface 68 of disc 28. The latter termination point is shown at 88 in FIG. 6. The termination points 86 and 88 lie quite close to the centerline on which the disc 28 is rotated and thus they are in regions wherein linear movement of the peripheral portions of the valve disc 28 for each degree of angular movement thereof is very much smaller than is the case in regions more remote from said axis of rotation. For this reason the ledge 78 is not required to extend close to said axis.

Figure 6:
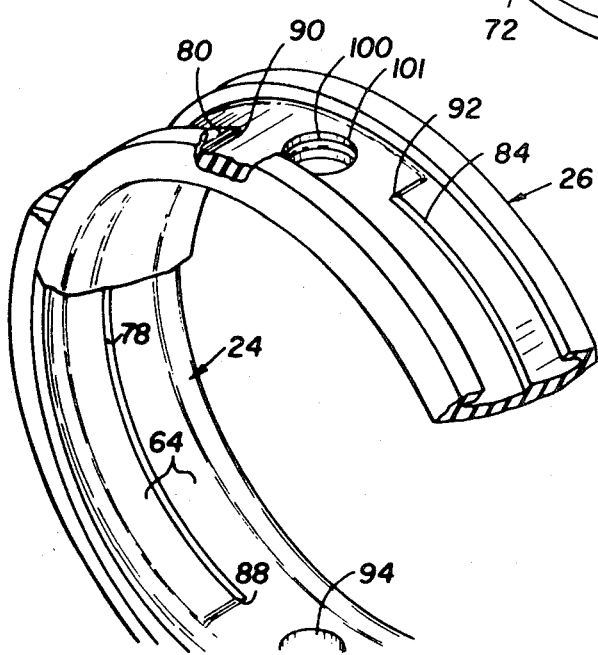

In FIG. 6 the relationship between the ledge 78 on the valve body 24 and the ledge 80 on the elastomeric valve seat insert 26 is revealed by appropriate breaking away of parts. Thus the ledge 80 terminates at a point 90 which coincides with the point 86 at which the ledge 78 terminates as shown in FIG. 3. Also in FIG. 6 the ledge 84 on the seat insert 26 is shown terminating at a point 92. It will be understood that the ledge 82 on valve body 24 will terminate at a point (not shown) which coincides with the point 92 and it also will be understood that both of the ledges 82 and 84 will have coinciding termination points toward the lower right-hand portion of the valve.

The valve body 24 (FIG. 6) is provided with an opening 94 through which the lower portion of the stem assembly of the valve disc 28 extends into the lower neck 32 (FIG. 3). In FIG. 5 the elastomeric valve seat insert 26 is provided with a lower stem-receiving opening 96 which falls into alinement with the opening 94 in the valve body. While no attempt has been made herein to show the complete sealing and bearing arrangements for the stem assembly of valve disc 28 there is shown in FIG. 5 a recess 98 molded into the elastomeric material, said recess 98 being provided to receive an O-ring with suitable retainer of familiar construction for forming a fluid tight seal between the seat insert 26 and the lower portion of the disc assembly. A similar recess 100 (FIG. 6) is shown in a corresponding opening 101 for the upper portion of the stem assembly.

As has been pointed out above the elastomeric seat insert 26 is so related in shape and dimensions with respect to the valve body 24 that the elastomeric material of which the insert 26 is made must be stretched in carefully predetermined manner for installation upon the valve body and certain regions of the insert remain under stretched conditions throughout service life. Referring first to FIG. 7, the valve body 24 is shown in full lines in a sectional view which corresponds with the section shown on the right-hand side of FIG. 2. The elastomeric seat insert 26 is shown in phantom to illustrate the corresponding cross-sectional shape thereof in a relaxed, unfitted condition which it assumes, for example, when it comes from the mold from which it was manufactured. The phantom view of the seat insert 26 is so superimposed upon the showing of the valve body 24 that the ledge 84 of the seat insert has been made to coincide with the ledge 82 of the valve body insofar as that is possible. A particular point to be noted in FIG. 7 is that the dimension A indicating the distance between the high points of the ribs 62 formed on body 24 is greater than the dimension B which indicates the distance between the points on the elastomeric seat insert 26 which will fall upon the high points of ribs 62 when the seat 26 is fitted to the valve body 24.

In FIG. 8 the step of fitting the elastomeric seat insert 26 to the body 24 has been started. One of the beads 56 of insert 26 has been positioned in the groove 60 on the left-hand side of FIG. 8 and the valve insert 26 now is being pulled in the direction of the arrow 102 thus causing the seat portions 52 to be stretched as indicated by the broken-line arrow 104 and also causing the left-hand flange sealing portion 54 to be stretched around the rib 62 as indicated by the broken-line arrow 106. To complete the fitting of the seat insert 26 the bead 56 on the right-hand side of FIG. 8 must now be forced over the curved surface of right-hand rib 62 and thereafter allowed to snap into the adjacent groove 60.

Referring now to FIG. 9 wherein fitting of the seat insert 26 to the valve body 24 has been completed it will be appreciated that, due to the continuous efforts of the stretched portions of the elastic material of seat insert 26 to return to their original dimensions, certain forces will be set up at points of contact between the insert and the valve body. In the present invention these forces serve to hold the seat 26 firmly and securely sprung into position upon the valve body 24. Thus, as indicated by the broken-line arrow 104 in FIG. 9 the seat portion 52 of the seat insert 26 is still stretched to the extent established by the difference between the dimensions A and B pointed out in FIG. 7. The recovery forces resulting from such stretched condition will continuously attempt to unhook the beads 56 and flange sealing portions 54 from the ribs 62 as indicated by the broken-line arrows 106 and 108. Unhooking, however, is prevented by forces which exert pressure in opposed directions, indicated by full-line arrows 110 and 112, between the beads 56 and the valve body 24. The forces indicated by the arrows 110 and 112 react respectively against the undersides of ribs 62 and the bottom wall of each of the grooves 60 whereby the beads 56 on both sides of FIG. 9 are firmly wedged in angularly cocked positions within the grooves 60. This is the condition in which the valve assembly is delivered to the user. Because of this firmly wedged condition unseating of the elastomeric insert 26 from the valve body 24 can only be effected by the application of considerable force in specific directions, for example by prying with a bladed tool inserted between the lower surface of a bead 56 and the lower wall of the associated groove 60. Consequently the forces ordinarily encountered in handling, packing and shipping of the assembled valve will present little, if any, danger of unseating of the valve seat insert 26.

The particular features of the present invention which contribute the improvements thereof over the butterfly valve disclosed and claimed in said application Ser. No. 147,400 will now be described with particular reference to FIGS. 7 through 10. In FIG. 7 it will be noted that the flange sealing portions 54 of the insert 26 in the "as molded" condition include side walls 114 which flare outwardly in a direction extending toward the axis of the valve body 24. Preferably the walls 114, as molded, are disposed at an angle of about 15° or somewhat more with respect to the plane of the walls 58 of the valve body 24. The walls 114 each intersect at points 115 with gently sloping surfaces 117 each of which extends axially outwardly from the center of the seat portion 52 of the insert 26. The intersection points 115 may be relatively sharp but in accordance with customary standards for elastomeric moldings will preferably be rounded on radii of about 1/32 inch. Similarly the walls 114 each intersect at a point 119 with the lower surface of each of the beads 56, with appropriate rounding on similar radii.

The liner or insert 26 is so proportioned with respect to the valve body 24 to which it is to be fitted that when it is stretched and fitted as shown in FIG. 9 the walls 114 of flange sealing portions 54 will each flare outwardly with respect to the plane of end walls 58 of the valve body at an angle which is somewhat less than the 15° angle mentioned above. Preferably, the radially outward points 119 will lie approximately in the plane of the end walls 58 and the radially inward points 115 will extend axially outwardly of the valve body 24. The flange sealing portions 54 therefore each will include triangular cross-sectional areas located radially inwardly of walls 58 and which progressively flare axially outwardly of the plane of walls 58. The volume of elastomeric material contained in the annular portions represented by such triangular cross-sectional areas will be primarily concentrated in the region above the high points of ribs 62, as viewed in FIG. 9. It is this volume of elastomeric material which is squeezed downwardly to effect a tight seal between the flanges 18 and 22 and the ribs 62 when the assembly shown in FIG. 9 is installed between flanges as will be explained hereinbelow.

In FIG. 9 it will be observed that there is a void 116 of generally rectangular shape lying between each of the inner ends of the beads 56 and the inner vertical wall of each of the grooves 60. There is also a void 118 of generally wedge shape lying between the lower surfaces of each of the beads 56 and the bottom wall of each of the grooves 60. Further, there is a generally crescent-shaped void 120 lying between the under surface of the seat portion 52 and the upper surface of each of the ribs 62 as well as adjacent regions of the seat supporting surface 64 of the valve body 24. These voids are present as a result of the stretching and cocking of the insert 26 upon the valve body 24 into the fitted position prior to installation of the assembly in a line.

In said application serial number 147,400 all of said voids 116, 118 and 120 are designed to be closed by movement of elastomeric material or filled by displacement of elastomeric material under compression when the valve assembly is installed between flanges in a pipe line. In particular, in said application Ser. No. 147,400, the beads 56 on seat insert 26 are so sized relative to the size of the grooves 60 in the valve body that when supplemented by elastomeric material displaced from above the level of the high points of ribs 66 on the valve body, the beads 56 will tightly fill the grooves 60, thus entirely eliminating the voids 116. To insure such action over a reasonable range of dimensional manufacturing tolerances for both valve seat and valve body said application Ser. No. 147,400 teaches that the design dimensions of the insert 26 must be so related to the design dimensions of the valve body 24 that more than enough elastomeric material is always available for displacement into the grooves 60 to fill the grooves and to insure that the elastomeric material in the grooves will be placed under sufficient compressive stress that some fraction of the displaced elastomeric material will feed back toward or beyond the high points of the ribs 62.

The present invention departs sharply from that teaching and in doing so very materially increases the permissible ranges of dimensional tolerances for both valve body and valve insert.

To the end just stated the grooves 60 in the valve body 24 are made sufficiently deep in an axial direction having regard for the dimensions of the beads 56 on the insert 26 and the amount of elastomeric material in the annular portions of triangular cross section of the insert 26 which extend axially outwardly of the plane of the end walls 58 of the valve body in the assembled condition illustrated in FIG. 9, that when the valve assembly is installed between flanges as shown in FIG. 10 the grooves 60 will not be filled, that is the recesses 116 will be reduced in volume but will continue to exist. As will be apparent the depth of grooves 60 may be made substantially in excess of the theoretical minimum thereby providing plenty of room for wide variations in the amount of elastomeric material which may be forced into the grooves in any particular instance. This substantially widens the ranges of acceptable manufacturing tolerances which may be established for the making of molds in which the elastomeric insert 26 is to be formed, for inspection of the molded inserts, for casting of the valve body 24 and for machining of those surfaces of the body which are to be machined.

If so desired, although it is not shown herein, the annular corners 121 at the intersections of end walls 58 with the lower surfaces of grooves 60 may be chamfered, say at 45°, or rounded, to provide even more room for reception of elastomeric material without danger of feed back into the valve seat portion 52 of the insert 26.

When a valve assembly as shown in FIG. 9 is to be installed between flanges in a pipe line it is first inserted between flanges 18 and 22 such as are shown in FIG. 10 and the flanges are then squeezed axially inwardly in the directions indicated by arrows 122 in said FIG. 10. As the flanges move inwardly they will first engage the intersections 115 which constitute the most outwardly flared parts of the flange sealing portions 54 of insert 26. Continued inward movement of the flanges will progressively fulcrum the insert 26 about points 124 to close the crescentshaped recesses 120 beneath the seat portion 52 of the insert. This fulcruming action also will move the beads 56 progressively into grooves 60 and will squeeze the elastomeric material in the triangular shoulder portions downwardly and into the region between the flanges 18 and 22 and the rounded high points of ribs 62. Those portions of the triangularly shaped shoulders which are displaced downwardly will flow past the ribs 62 and towards the grooves 60 and will be placed under increasing compressive stress as the space between the flanges and ribs 62 continues to become smaller. During the early stages of the squeezing operation the elastomeric material will flow quite freely around the ribs 62 and into grooves 60. As compressive stress increases in axial directions upon the elastomeric material between the flanges and the high points of the ribs 62 the elastomeric material continues to be relatively free to flow into the still unfilled grooves 60 thereby restricting the zones of compressive stress to zones extending axially outwardly from the high points of each of the ribs 62. Since the grooves 60 are too deep to be filled the elastomeric material displaced into them will not be placed under sufficient compressive stress to cause any feed back of elastomeric material upwardly past the ribs 62 or into the stretched seat portion 52 of the insert 26. In the final installed position shown in FIG. 10 therefore the recesses 116 will remain unfilled and the sealing of the installation is assured by the fact that the elastomeric material in the zones of compressive stress will remain permanently under such stress.

The action of the elastomeric material in the flange sealing portions 54 during the installation between flanges 18 and 22 as just described therefore may be very roughly equated with the forcing of a tapered rubber stopper into the neck of a bottle. However, in contrast with such analogy, the fluid pressure which is placed upon the pipe line after installation will be exerted on the radially inward surface of the liner 26 and will tend constantly to force more of the elastomeric material which was formerly in the outwardly flaring triangular portions into the zones lying between the flanges 18 and 22 and the high points of the ribs 62. Since the recesses 116 always remain available for further displacement of elastomeric material the application of progressively higher fluid pressures upon the pipe line within design limits thus will progressively tighten the seal and will not result in rigidifying of the elastomeric material radially beyond the ribs 62 with consequent danger of feed back into the seat portion 52. The valve seat insert of the present invention therefore offers unique advantage over those prior art designs, including that disclosed and claimed in said application Ser. No. 147,400, wherein filling of all recesses has been required to establish desired tightness of seal.

What is claimed is:

1. In a butterfly valve assembly for installation in a pipe line between flanges having spaced parallel planar annular faces, each face extending transversely of and centered upon the lengthwise axis of said pipe line; said valve assembly comprising: a tubular valve body made of rigid material and having parallel planar annular end walls centered upon said axis of the pipe line in which said assembly is to be installed, each of said end walls being adapted to make face-to-face contact with one of said faces of said flange, said valve body having an inner circumferential valve-seat-supporting surface extending axially of said pipe line, said valve body having a pair of annular grooves each of said grooves being defined by a radially outwardly positioned wall extending axially inwardly from the radially inward circumference of one of said end walls and a radially inwardly positioned wall, each of said grooves having a predetermined depth measured axially of said valve body, and said valve body having a pair of oppositely disposed annular ribs each of said ribs extending axially outwardly from said valve-seat-supporting surface and each of said ribs terminating axially inwardly of the plane of one of said end walls in a rib surface which intersects said radially inwardly positioned wall of one of said grooves; and a valve seat insert made of elastomeric material having a tubular seat portion the exterior circumferential surface of which is shaped to engage said valve-seat-supporting surface and the interior circumferential surface of which is shaped to define a tubular fluid passageway extending axially through said valve assembly when said seat insert is fitted upon said valve body; the improvement comprising a pair of flange-sealing portions integral with and extending axially outwardly and radially outwardly from the opposite axial ends of the tubular seat portion of said valve seat insert, each of said flange-sealing portions having a recess facing axially inwardly and shaped to fit upon one of said ribs, an axially inwardly extending annular bead formed radially outwardly of said recess and shaped to enter one of said grooves, and an annular flange-engaging surface which when said insert is fitted upon said valve body ready for installation between flanges of a pipe line slopes axially outwardly with respect to the plane of the adjacent one of said end walls of said valve body, the radially outward periphery of said flange-engaging surface on each of said flange-sealing portions lying approximately within said plane of the adjacent one of said end walls and the radially inward periphery thereof forming an intersection with an axially outward extension of said inner circumferential surface of said insert in a plane axially outwardly disposed with respect to said plane of said adjacent end wall, and said annular bead on each of said flange-sealing portions having a volume of elastomeric material which is less than the volume of the one of said annular grooves which said bead is shaped to enter by an amount sufficient to insure that space is left unfilled by elastomeric material within each of said grooves when said valve body with said valve seat insert fitted thereon is installed between flanges of a pipe line.

2. A butterfly valve assembly in accordance with claim 1 in which the distance measured axially of said valve body between said rib surface of one of said ribs and said rib surface of the other of said ribs is greater by a predetermined amount than the distance measured axially of said valve seat insert between said recess in one of said flange sealing portions and said recess in the other of said flange sealing portions when said valve seat insert is not fitted upon said valve body, whereby to fit said valve seat insert upon said valve body it is necessary to stretch said tubular seat portion axially to force said flange sealing portions over said ribs, the recovery forces exerted by said stretched seat portion thereafter being continuously effective to hold said seat portion firmly engaged with said valve seat supporting surface of said valve body.

3. A butterfly valve assembly in accordance with claim 1 in which said rib surface of each of said ribs of said valve body is convex.

4. A butterfly valve assembly in accordance with claim 2 in which said rib surface of each of said ribs of said valve body is convex.

5. A butterfly valve assembly in accordance with claim 1 in which the volume of elastomeric material in said bead on each of said flange-sealing portions is made less than the volume of the one of said annular grooves which said bead is shaped to enter by making the length of said bead measured axially of said valve seat insert less than said predetermined depth of said groove.

* * * * *